(12) United States Patent
Roth

(10) Patent No.: US 11,852,748 B2
(45) Date of Patent: Dec. 26, 2023

(54) METHOD FOR OPERATING A HEATING DEVICE FOR CONTROLLING THE TEMPERATURE OF A RADOME OF A RADAR SENSOR OF A VEHICLE BY USING IMAGE DATA FROM A CAMERA, COMPUTING DEVICE, HEATING CONTROL SYSTEM AND VEHICLE

(71) Applicant: Bayerische Motoren Werke Aktiengesellschaft, Munich (DE)

(72) Inventor: Jonathan Roth, Starnberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/704,414

(22) Filed: Mar. 25, 2022

(65) Prior Publication Data

US 2022/0317245 A1 Oct. 6, 2022

(30) Foreign Application Priority Data

Apr. 1, 2021 (DE) ...................... 10 2021 108 439.3

(51) Int. Cl.
*G01S 7/40* (2006.01)
*G01S 13/931* (2020.01)
*G01S 13/86* (2006.01)

(52) U.S. Cl.
CPC .......... *G01S 7/4047* (2021.05); *G01S 13/867* (2013.01); *G01S 13/931* (2013.01); *G01S 2013/93271* (2020.01)

(58) Field of Classification Search
CPC .... G01S 7/4047; G01S 13/867; G01S 13/931; G01S 2013/93271
See application file for complete search history.

(56) References Cited

U.S. PATENT DOCUMENTS

| 6,414,623 B1 | 7/2002 | Ashihara |
| 2013/0151135 A1* | 6/2013 | Aubrey ................ G08G 1/0116 701/117 |

(Continued)

FOREIGN PATENT DOCUMENTS

| CN | 211858849 U | * 11/2020 |
| DE | 202016106799 U1 | * 1/2017 |

(Continued)

OTHER PUBLICATIONS

German-language Search Report issued in German Application No. 10 2021 108 439.3 dated Jan. 12, 2022 with English translation (10 pages).

(Continued)

*Primary Examiner* — Timothy A Brainard
(74) *Attorney, Agent, or Firm* — Crowell & Moring LLP

(57) ABSTRACT

A method for operating a heating device for controlling the temperature of a radome of a radar sensor of a vehicle includes the steps of: receiving surroundings data that describe surroundings of the vehicle and/or at least one area of the radome of the vehicle, detecting a deposit of a precipitation on the radome on the basis of the surroundings data, outputting a heating signal to the heating device in order to control the temperature of the radome on the basis of the detected deposit of the precipitation. The surroundings data received are image data from at least one camera of the vehicle. The image data are used to detect the precipitation in the surroundings and/or on the area of the radome.

10 Claims, 2 Drawing Sheets

(56) References Cited

U.S. PATENT DOCUMENTS

| | | |
|---|---|---|
| 2019/0377064 A1 | 12/2019 | Scheske et al. |
| 2020/0101889 A1* | 4/2020 | Iwai et al. |
| 2020/0200868 A1* | 6/2020 | Meier .................. H01Q 1/02 |
| 2020/0246812 A1* | 8/2020 | Schmalenberg .......... F41H 9/06 |
| 2021/0285867 A1* | 9/2021 | Dumler .................. G01N 21/47 |

FOREIGN PATENT DOCUMENTS

| | | | |
|---|---|---|---|
| DE | 10 2016 123 637 A1 | 6/2018 | |
| DE | 10 2017 221 589 A1 | 6/2019 | |
| DE | 10 2018 202 201 A1 | 8/2019 | |
| DE | 102018202201 A1 * | 8/2019 | ........... G01S 13/867 |
| DE | 10 2019 113 158 A1 | 12/2019 | |
| JP | 60-173084 U | 11/1985 | |
| JP | 2000-321348 A | 11/2000 | |
| JP | 2018-146342 A | 9/2018 | |
| JP | 2020-50271 A | 4/2020 | |

OTHER PUBLICATIONS

Japanese-language Office Action issued in Japanese Application No. 2022-019524 dated Mar. 14, 2023 with English translation (11 pages).

* cited by examiner

METHOD FOR OPERATING A HEATING DEVICE FOR CONTROLLING THE TEMPERATURE OF A RADOME OF A RADAR SENSOR OF A VEHICLE BY USING IMAGE DATA FROM A CAMERA, COMPUTING DEVICE, HEATING CONTROL SYSTEM AND VEHICLE

CROSS REFERENCE TO RELATED APPLICATION

This application claims priority under 35 U.S.C. § 119 from German Patent Application No. 102021108439.3, filed Apr. 1, 2021, the entire disclosure of which is herein expressly incorporated by reference.

BACKGROUND AND SUMMARY

The present disclosure relates to a method for operating a heating device for controlling the temperature of a radome of a radar sensor of a vehicle. The present disclosure also relates to a computing device and a heating control system. Finally, the present disclosure relates to a vehicle having such a heating control system.

Vehicles having modern driver assistance systems often comprise radar sensors, which are used to detect objects in the surroundings of the vehicle, for example. In addition, such radar sensors are used together with longitudinal control systems. These radar sensors are covered and protected against environmental influences by a so-called radome. In particular in cold weather conditions in combination with precipitation, a deposit forms on the radome that unfavorably influences the ability of the radar and the driver assistance system to function.

To counter this problem, heating devices for radomes of radar sensors are known from the prior art. These heating devices can be used to heat or control the temperature of the radome. The heating devices based on the prior art are actuated on the basis of the temperature of the surroundings, for example. By way of example, there may be provision for the heating device to be activated in a temperature range from −5° C. to 5° C. There is not usually provision for information about the present state of the radome to be fed back.

DE 10 2017 221 589 A1 discloses a heating system for a radome of a radar for a motor vehicle, the heating system comprising a heating element for heating the radome and a control unit, connected to the heating element, for activating the heating element. The control unit is designed to receive or determine a variable that is characteristic of an outside temperature, to receive or determine a variable related to a melting point of precipitation deposits on an exterior radome surface, to determine at least one temperature threshold value on the basis of the variable related to the melting point, and to activate the heating element on the basis of a threshold value comparison of the outside temperature with the temperature threshold value.

It is an object of the present disclosure to demonstrate a solution to how the temperature control of a radome of a radar sensor of a vehicle can be accomplished in an energy-efficient manner with little complexity.

This object is achieved by a method, by a computing device, by a heating control system and by a vehicle having the features according to the independent claims. Advantageous developments are specified in the dependent claims.

A method is used for operating a heating device for controlling the temperature of a radome of a radar sensor of a vehicle. The method comprises receiving surroundings data that describe surroundings of the vehicle and/or at least one area of the radome of the vehicle. The method also relates to detecting a deposit of a precipitation on the radome on the basis of the surroundings data. Furthermore, the method comprises outputting a heating signal to the heating device in order to control the temperature of the radome on the basis of the detected deposit of the precipitation. In addition, there is provision for the surroundings data received to be image data from at least one camera of the vehicle, and for the image data to be used to detect the precipitation in the surroundings and/or on the area of the radome.

The method is intended to be used to control the temperature of the radome of the radar sensor. In particular, the radome is intended to be heated or warmed by means of the heating device. The radome serves as a cover for the radar sensor of the vehicle and therefore as protection for the radar sensor against environmental influences. The radome may be formed by an area of a bumper, a badge and/or a cladding element of the vehicle. During operation of the radar sensor, the radar sensor transmits and receives back electromagnetic rays through the radome.

The method can be performed using a computing device of the vehicle. This computing device may be formed by at least one electronic control unit. This computing device can be used to receive the surroundings data. These surroundings data can describe the surroundings of the vehicle, or an area of the surroundings of the vehicle. Alternatively or additionally, the surroundings data can describe the radome itself or a portion thereof. The surroundings data can be used by the computing device to ascertain whether the radome has the deposit of the precipitation on it. The precipitation may be in particular ice, snow and/or water, including impurities. This precipitation can be deposited on the radome in particular at ambient temperatures below freezing. This can result in the transmission and/or reception of electromagnetic radiation through the radome being adversely affected. In order to be able to remove this deposit of the precipitation from the radome, the heating device is activated. For this purpose, the heating signal is transmitted from the computing device to the heating device. The heating signal can be output as a voltage and/or as an electric current. In order to activate the heating device, a voltage can thus be applied to the heating device and/or the heating device can have an electric current flow through it. The heating signal can predefine or adjust a heating power of the heating device.

According to the present disclosure, there is provision for the surroundings data received to be the image data. These image data can comprise a digital image or a sequence. In particular, the image data can describe the visible wavelength range. These image data can be provided by a camera of the vehicle. The image data can describe the precipitation that is present in the surroundings. By way of example, the image data can be used to determine whether ice or snow is present in the surroundings. Alternatively or additionally, the image data can describe the radome itself or an area thereof. In order to be able to provide such image data, a camera of the vehicle can be used whose capture zone has at least areas of the radome situated in it.

According to the present disclosure, there is thus provision for using the image data from the camera that is usually present on modern vehicles anyway. It is therefore not necessary for an additional sensor, for example a temperature sensor, to be installed. The image data can be used to control the heating device. On the whole, the heating device of the radome can therefore easily be operated in an energy-efficient manner.

In order to detect the deposit, a deposit probability, which describes a probability of there being the deposit of the precipitation on the radome, is preferably determined on the basis of the image data, and the heating signal is output on the basis of the deposit probability. The image data can thus be used to determine the deposit probability. The image data can be used to detect the precipitation and possibly also the type of the precipitation. This information can then be used to assess whether the precipitation has been deposited and/or will be deposited on the radome. If the deposit probability is high, the heating signal can be output, or a relatively high heating power can be provided by the heating device. If the deposit probability is low, output of the heating signal can be prevented, or a relatively low heating power can be provided by the heating device. This allows the radome to be heated as needed and in an energy-efficient manner.

In a further embodiment, the image data describe the area of the radome and/or the deposit of the precipitation on the area of the radome. By way of example, the camera of the vehicle may be arranged on the vehicle in such a way that the area or the whole radome is situated in the capture zone of the camera. The camera may be arranged on the radome itself, for example. The camera may also be arranged on a part of the vehicle that adjoins the radome. In particular, the camera can have a capture zone of approximately 180°. Here, the camera can have a fisheye lens or the like. The camera can be used to capture at least part of an outer side of the radome. The outer side describes that side of the radome that faces an observer standing in front of the vehicle.

The deposit of the precipitation on the radome is detected on the basis of an evaluation of the image data. The range of the image data that is associated with the radome may be known. It is possible to check whether the deposit can be detected in this range of the image data, or in the corresponding pixels. The precipitation can also be detected on the basis of its color, and therefore be distinguished from other soiling. The precipitation can also be detected on the basis of the color of the picture elements. By way of example, the precipitation can have a gray and/or white color.

In a further embodiment, an amount of the precipitation can also be detected. The amount of the precipitation can be detected from the layer thickness on the basis of the image data, for example. The detected amount can be taken as a basis for adjusting the heating power of the heating device. The image data can also be used to characterize the precipitation. By way of example, a distinction can be made between a layer of ice, a layer of snow and/or a deposit of a slush. The characterization can be taken as a basis for adjusting the heating power of the heating device accordingly.

In a further configuration, the image data describe the precipitation on and/or beside a road on which the vehicle is situated. Alternatively or additionally, the image data describe the falling precipitation. The image data can be used to detect ice or snow on the road as the precipitation, for example. In principle, ice or snow that has settled in the surroundings of the vehicle can be detected. This information can be taken into consideration when determining the deposit probability. The image data can also be used to detect whether the precipitation is currently settling or falling in the surroundings. If snowfall is detected, for example, the deposit probability can also be increased, since it can be assumed that the snow is also being deposited on the radome. A temperature in the surroundings can also be taken into consideration in this instance.

Furthermore, it is advantageous if the image data describe the precipitation hurled up during convoy travel in which another road user travels in front of the vehicle. Convoy travel describes the traffic situation in which the other road user is in front of the vehicle and travelling in the same direction of travel. In particular, this convoy travel can result in the wheels of the road user swirling up the precipitation that has been deposited on the road and settling it on the radome of the radar sensor. Such convoy travel with precipitation swirled up can result in the deposit probability increasing. The temperature in the surroundings can be taken into consideration in this instance too.

A further configuration provides for the surroundings data received to be further data that describe a temperature in the surroundings, a humidity in the surroundings and/or a position of the vehicle, the precipitation being characterized on the basis of the image data and/or the further data. Besides the image data, further surroundings data can also be received and taken into consideration for controlling the heating device. By way of example, data from a temperature sensor that describe the temperature in the surroundings of the vehicle can be received. Additionally, data that describe a humidity, or moisture, in the surroundings can be received. Position data that describe the position, or a latitude, at which the vehicle is currently situated can also be received. These position data can be used to deduce the melting temperature of the precipitation, for example, and therefore to adjust the heating power. Similarly, the position data can be used to determine whether salt is spread in this region in order to lower the melting point. Speed data from a speed sensor can also be received. These speed data can be used to infer the deposit and/or the amount of the precipitation on the radome. This is suitable in particular for convoy travel as described above. All in all, the further data, or surroundings data, can also be taken into consideration for determining the deposit probability.

There may also be provision for the precipitation to be characterized. This means in particular that a distinction can be made between ice, snow, slush, hail, sleet, fog, water or the like. This distinction can be made on the basis of the image data. This can be accomplished using known algorithms for image processing, for example. The further data or environmental data can also be used to characterize the precipitation. In addition, data from weather services can also be taken into consideration.

In this regard, a distinction can also be made between different types of snow. At very low temperatures, for example at temperatures below −1° C., and/or low humidity, powder snow usually occurs. This powder snow does not stick together, even under pressure, and is therefore not deposited, or is deposited only to a small extent, on the radome. Heating the radome is counterproductive in the case of this powder snow. By way of example, it could lead to this powder snow becoming partly thawed and therefore adhering to the radome more easily. By contrast, at higher temperatures, for example at temperatures above 0° C., and/or high humidity, damp snow, wet snow and/or poor snow usually occur. These types of snow tend toward heavier deposits and require a higher heating power. By taking the different types of precipitation, or snow, and the associated heating strategy into consideration, the functional availability of the radar sensor and of the driver assistance system connected thereto can be improved.

It is also possible to detect a deposit of the precipitation on the camera, or a lens of the camera. This deposit can be detected on the basis of the image data. If this deposit is detected, the heating signal can be output, or operation of the heating device can be controlled.

A computing device for a heating control system for a radome of a vehicle according to the disclosure is designed to perform a method according to the disclosure and advantageous configurations. The computing device can comprise at least one electronic control unit.

A heating control system for a radome of a vehicle according to the disclosure comprises a computing device. The heating control system also comprises a heating device for controlling the temperature of the radome. By way of example, the heating device can comprise appropriate wires that have an electric current flowing through them as a result of the output of the heating signal. The heating device may be electrically connected to the computing device. In addition, the heating control system can have at least one camera for providing image data. The at least one camera may be connected to the computing device for the purpose of data transmission, or for the purpose of transmitting the image data. The camera can also have a camera heater in order to prevent the precipitation from being deposited on the camera, or a lens of the camera.

A vehicle according to the disclosure comprises a heating control system. The vehicle may in particular be in the form of an automobile. The camera is preferably arranged on the vehicle in such a way that at least one area of the radome is situated in a capture zone of the camera. The camera may be part of a surround view system, for example, and arranged on the front of the vehicle. Alternatively or additionally, the camera may be arranged behind a windshield of the vehicle. The vehicle, or the heating control system, can have a first camera on the front of the vehicle and a second camera behind the windshield. An assessment concerning the deposit of the precipitation on the radome can therefore be made even in the case of vehicles that have only the second camera behind the windshield simply on the basis of the precipitation in the surroundings and/or the precipitation swirled up during convoy travel.

In particular if the vehicle is in the form of an at least partly electrically driven vehicle, energy-efficient operation of the heating device is advantageous. Compared to known heating control systems, which often require a heating power of up to 80 W, the heating power can be deliberately increased or decreased according to the invention. This allows the range to be increased in particular in the case of at least partly electrically driven vehicles.

A further aspect of the disclosure relates to a computer program, comprising instructions that, when the program is executed by a computing device, cause said computing device to carry out a method according to the disclosure and the advantageous configurations thereof. In addition, the disclosure relates to a computer-readable (storage) medium, comprising instructions that, when executed by a computing device, cause said computing device to carry out the method and the advantageous configurations thereof.

The preferred embodiments presented with reference to the method, and the advantages of said embodiments, apply accordingly to the computing device, to the heating control system, to the vehicle, to the computer program and to the computer-readable (storage) medium.

Further features of the disclosure emerge from the claims, the figures and the description of the figures. The features and combinations of features that are cited in the description above, and the features and combinations of features that are cited in the description of the figures below and/or shown in the figures alone, can be used not only in the particular indicated combination but also in other combinations or on their own, without departing from the scope of the disclosure.

Other objects, advantages and novel features of the present disclosure will become apparent from the following detailed description of one or more preferred embodiments when considered in conjunction with the accompanying drawings.

DETAILED DESCRIPTION OF THE DRAWINGS

In the figures, elements that are identical or that have an identical function are provided with the same reference signs.

Figure 1:
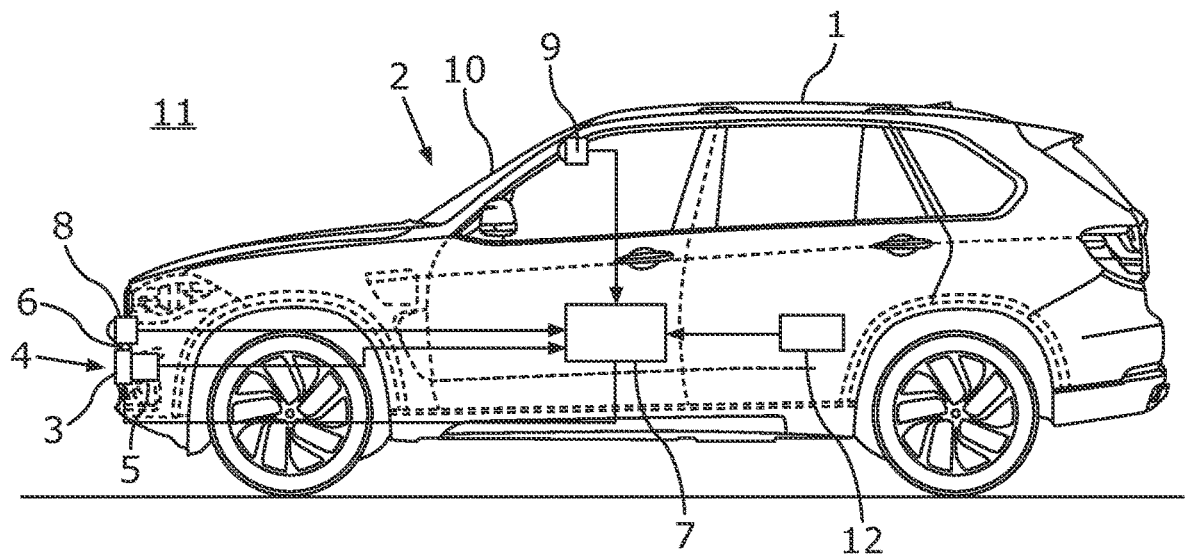
FIG. 1 is a schematic representation of a vehicle that has a heating control system for controlling the temperature of a radome of a vehicle.

FIG. 1 shows a schematic representation of a vehicle 1, which is in the form of an automobile, in a side view. The vehicle 1 comprises a heating control system 2. This heating control system 2 in turn comprises a heating device 3 that is used to control the temperature of, or to heat, a radome 4 of the vehicle 1. The radome 4 serves as a cover for a radar sensor 5 of the vehicle 1. In the example shown, the radome 4 is formed by an area of an exterior cladding part 6 of the vehicle 1.

The heating control system 2 also comprises a computing device 7, which can comprise at least one electronic control unit. In addition, the heating control system 2 comprises a first camera 8, which is arranged on a front of the vehicle 1 in the example. Additionally, the heating control system 2 has a second camera 9, which is arranged behind a windshield 10 of the vehicle 1 in the example. The first camera 8 and the second camera 9 can each be used to provide image data that describe surroundings (environment) 11 of the vehicle 1. These image data are surroundings data. Further surroundings data that can be provided are data that describe a temperature and/or a humidity in the surroundings 11. The surroundings data can also describe a present position of the vehicle 1. These further surroundings data are provided by means of a unit 12 in the example.

Figure 2:
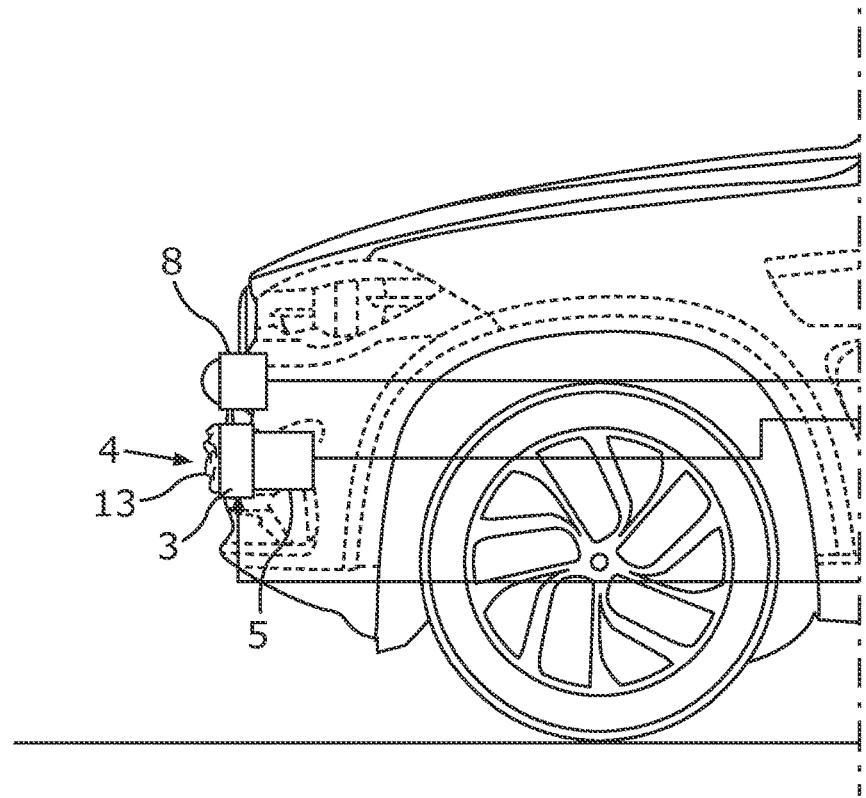
FIG. 2 is an enlarged representation of the vehicle shown in FIG. 1 that shows a deposit of a precipitation on the radome.

FIG. 2 shows an enlarged representation of the vehicle 1 shown in FIG. 1. In this case, it can be seen that there is a deposit 13 of a precipitation on the radome 4. Precipitation can be ice, snow, slush or the like. This deposit 13 adversely affects the radar sensor 5 when transmitting and/or receiving a radar signal, or electromagnetic radiation. In order to remove the deposit 13 from the radome 4, or to melt the deposit 13, the heating device 3 is provided. This heating device 3 can be actuated, or activated, by means of the computing device 7.

The image data from the first camera 8 can be used to detect the deposit 13 on the radome 4. The first camera 8 is arranged on the vehicle 1 in such a way that at least areas of the radome 4 are situated in a capture zone of the first camera 8. The first camera 8 can preferably capture objects in an angle range of approximately 180°. In order to detect the deposit 13, the image data from the first camera 8 can be transmitted to the computing device 7 and evaluated by means of the computing device 7. The deposit 13 can be detected in a range of the image data that is associated with the radome 4. In particular, the deposit 13 can be detected on the basis of the color information. By way of example, a deposit 13 that comprises snow can be detected on the basis of the white or gray color.

The information about a presence and/or a form of the deposit determined on the basis of the image data is used to enable a control loop for heating the radome 4. In particular, the detected deposit 13, a type of the deposit 13 and/or an amount of the deposit 13 can be taken as a basis for controlling a heating power provided by the heating device 3.

Figure 3:
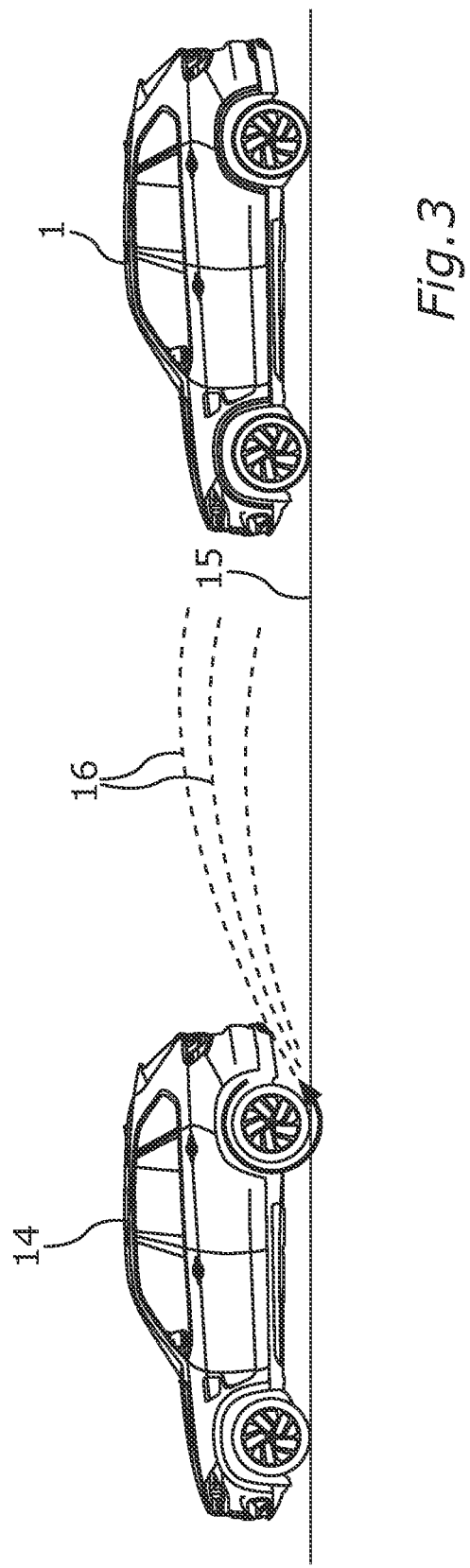
FIG. 3 shows the vehicle shown in FIG. 1 during convoy travel in which another road user is in front of the vehicle.

FIG. 3 shows a schematic representation of the vehicle from FIG. 1 during convoy travel. During this convoy travel, another road user 14 travels in front of the vehicle 1, the vehicle 1 and the other road user 14 moving in the same direction of travel. The other road user 14 is likewise an automobile in the example. It is assumed that a road 15 on which the vehicle 1 and the other road user 14 are situated has the precipitation on it. By way of example, there may be snow on the road 15 as precipitation. This precipitation on the road 15 and beside the road 15 can be detected on the basis of the image data from the first camera 8 and/or the second camera 9.

The precipitation on the road 15 can also be swirled up or hurled up by the wheels of the other road user 14 that are rolling on the road 15. This swirled-up precipitation is illustrated by the lines 16 in the present case. This swirled-up precipitation can also be detected on the basis of the image data from the first camera 8 and/or the second camera 9. The image data can be used to determine a deposit probability that describes a probability of there being the deposit 13 of the precipitation on the radome 4. Additionally, the further surroundings data can also be taken into consideration in order to determine the deposit probability. By way of example, the deposit probability can additionally be ascertained on the basis of the temperature, the humidity, the position of the vehicle 1 and/or the present speed of the vehicle 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a heating device for controlling a temperature of a radome of a radar sensor of a vehicle, comprising:
   receiving surroundings data that describe surroundings of the vehicle and/or at least one area of the radome of the vehicle, wherein the surroundings data comprise image data from at least one camera of the vehicle;
   detecting a deposit of a precipitation on the radome on the basis of the surroundings data, wherein the detecting of the deposit of the precipitation on the radome comprises using the image data to detect the precipitation in the surroundings and/or on the area of the radome;
   using the image data to determine a deposit probability, a type of the detected deposit of the precipitation, and/or an amount of the detected deposit of the precipitation, wherein the deposit probability describes a probability of there being the deposit of the precipitation on the radome; and
   outputting a heating signal to the heating device in order to control the temperature of the radome on the basis of the detected deposit of the precipitation,
   wherein a heating power of the heating device is determined based on the deposit probability, the type of the detected deposit of the precipitation, and/or the amount of the detected deposit of the precipitation.

2. The method according to claim 1, wherein
   the image data describe the area of the radome and/or the deposit of the precipitation on the area of the radome.

3. The method according to claim 1, wherein
   the image data describe precipitation on and/or beside a road on which the vehicle is situated, and/or
   the image data describe falling precipitation.

4. The method according to claim 1, wherein
   the image data describe precipitation hurled up during convoy travel in which another road user travels in front of the vehicle.

5. The method according to claim 1, wherein
   the surroundings data further comprise further data that describe a temperature in the surroundings, a humidity in the surroundings, and/or a position of the vehicle, and
   the precipitation is characterized based on the image data and/or the further data.

6. A computing device for a heating control system for a radome of a vehicle, comprising:
   a processor configured to:
      receive surroundings data that describe surroundings of the vehicle and/or at least one area of the radome of the vehicle, wherein the surroundings data comprise image data from at least one camera of the vehicle;
      detect a deposit of a precipitation on the radome on the basis of the surroundings data, wherein to detect the deposit of the precipitation on the radome, the image data are used to detect the precipitation in the surroundings and/or on the area of the radome;
      use the image data to determine a deposit probability, a type of the detected deposit of the precipitation, and/or an amount of the detected deposit of the precipitation, wherein the deposit probability describes a probability of there being the deposit of the precipitation on the radome; and
      output a heating signal to a heating device in order to control the temperature of the radome on the basis of the detected deposit of the precipitation,
      wherein a heating power of the heating device is determined based on the deposit probability, the type of the detected deposit of the precipitation, and/or the amount of the detected deposit of the precipitation.

7. A heating control system for a radome of a vehicle, comprising:
   the computing device according to claim 6;
   the heating device for controlling the temperature of the radome; and
   the at least one camera for providing image data.

8. A vehicle comprising a heating control system according to claim 7.

9. The vehicle according to claim 8, wherein
   the vehicle is an automobile.

10. The vehicle according to claim 8, wherein
the at least one camera is arranged on the vehicle such that at least one area of the radome is situated in a capture zone of the at least one camera.

\* \* \* \* \*